United States Patent
Vogel et al.

(10) Patent No.: US 10,735,211 B2
(45) Date of Patent: Aug. 4, 2020

(54) MEETING INSIGHT COMPUTING SYSTEM

(71) Applicant: Microsoft Technology Licensing, LLC, Redmond, WA (US)

(72) Inventors: Matthew Evan Vogel, Seattle, WA (US); Julie Christa Seto, North Bend, WA (US); Daniel Escapa, Seattle, WA (US); Hubert Van Hoof, Redmond, WA (US); Dheepak Ramaswamy, Seattle, WA (US); Brett Daniel Mills, Seattle, WA (US); Joseph Anthony Beernink, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 16/037,876

(22) Filed: Jul. 17, 2018

(65) Prior Publication Data
US 2019/0342107 A1 Nov. 7, 2019

Related U.S. Application Data

(60) Provisional application No. 62/667,362, filed on May 4, 2018.

(51) Int. Cl.
*H04L 12/18* (2006.01)
(52) U.S. Cl.
CPC ...... *H04L 12/1818* (2013.01); *H04L 12/1822* (2013.01); *H04L 12/1831* (2013.01)
(58) Field of Classification Search
None
See application file for complete search history.

(56) References Cited

U.S. PATENT DOCUMENTS

2008/0133282 A1\* 6/2008 Landar .................. G06Q 10/02
705/5
2018/0032967 A1\* 2/2018 Barker ............... G06Q 10/1095
(Continued)

OTHER PUBLICATIONS

"Using Outlook Scheduling Assistant to Create Meeting Invitations." Posted at <http://edtech.ut.edu/microsoft-office/333-using-outlook-scheduling-assistant-to-create-meeting-invitations> on Jun. 3, 2017. (Year: 2017).\*

*Primary Examiner* — Scott B Christensen
(74) *Attorney, Agent, or Firm* — Alleman Hall Creasman & Tuttle LLP

(57) ABSTRACT

A meeting insight computing system includes a meeting evaluation machine configured to collect quality parameters from meeting quality monitoring devices. The quality parameters each quantify meeting conditions during one or more previously-elapsed meetings and are usable to determine an overall quality score for each of the one or more previously-elapsed meetings. A graphical scheduling interface is configured to facilitate scheduling of an upcoming meeting at a designated meeting time, in a meeting location, and with one or more meeting participants. An insight generation machine is configured to report a meeting insight via the graphical scheduling interface. The meeting insight is based on the meeting time, the meeting location, the one or more meeting participants, and the quality parameters, and includes a recommendation to change one or more of the meeting time, meeting location, and meeting participants to improve a quality score of the upcoming meeting.

18 Claims, 6 Drawing Sheets

(56) References Cited

U.S. PATENT DOCUMENTS

| | | | |
|---|---|---|---|
| 2018/0082262 A1* | 3/2018 | Kathuria | G06Q 10/06393 |
| 2018/0107984 A1* | 4/2018 | Bender | G06Q 10/1093 |
| 2018/0143025 A1* | 5/2018 | Kurata | G01C 21/26 |
| 2018/0189743 A1* | 7/2018 | Balasubramanian | G06Q 10/1095 |
| 2018/0349858 A1* | 12/2018 | Walker | G06Q 10/1095 |

* cited by examiner

200

```
┌─────────────────────────────────────────────────────────────┐
│ COLLECT A PLURALITY OF QUALITY PARAMETERS FROM A PLURALTIY  │
│        OF MEETING QUALITY MONITORING DEVICES                │
│                                                         202 │
└─────────────────────────────────────────────────────────────┘
                              │
                              ▼
┌─────────────────────────────────────────────────────────────┐
│ RECEIVE AN INPUT TO SCHEDULE AN UPCOMING MEETING AT A USER- │
│ DESIGNATED MEETING TIME, IN A MEETING LOCATION, AND WITH ONE│
│              OR MORE MEETING PARTICIPANTS                   │
│                                                         204 │
└─────────────────────────────────────────────────────────────┘
                              │
                              ▼
┌─────────────────────────────────────────────────────────────┐
│  REPORT A MEETING INSIGHT GENERATED BASED ON THE MEETING    │
│   TIME, THE MEETING LOCATION, THE ONE OR MORE MEETING       │
│  PARTICIPANTS, AND THE PLURALITY OF QUALITY PARAMETERS  206 │
└─────────────────────────────────────────────────────────────┘
```

FIG. 2

WEEKLY MEETING TRENDS

BEST MEETING ROOMS:

ROOM 1127
ROOM 27B
TELECONFERENCE 7

502

BEST MEETING TIMES:

10 AM TUESDAY
3 PM WEDNESDAY
11 AM MONDAY

504

HIGHEST QUALITY MEETINGS:

PARTY PLANNING COMMITTEE
ENGINEERING BRAINSTORM
FINANCE REVIEW

MEETING INSIGHT COMPUTING SYSTEM

CROSS REFERENCE TO RELATED APPLICATIONS

This application claims priority to U.S. Provisional Patent Application Ser. No. 62/667,362, filed May 4, 2018, the entirety of which is hereby incorporated herein by reference for all purposes.

BACKGROUND

Interconnected "Internet of Things" (IoT) devices and sensors can be used to record and report data regarding their local environments. As modern workplaces come to embrace emerging technology, worker behaviors change, as do the relationships between physical spaces and the people and devices that occupy them.

BRIEF DESCRIPTION OF THE DRAWINGS

FIG. 2 illustrates an example method for computer-generating meeting insights.

FIG. 5 schematically depicts example meeting trends reported by a meeting trends reporting machine.

DETAILED DESCRIPTION

Figure 1:
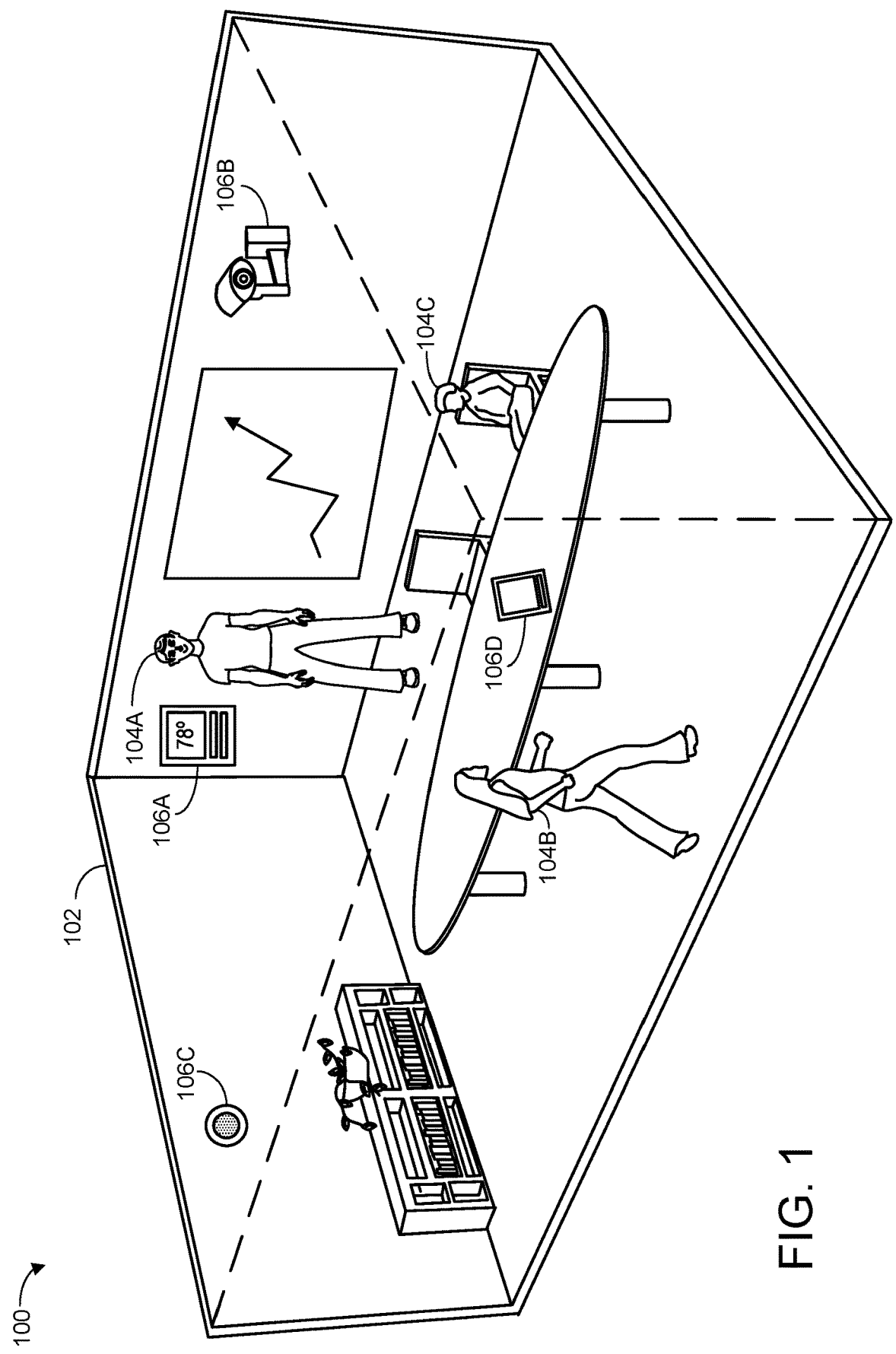
FIG. 1 depicts an example meeting including several meeting quality monitoring devices.

Many computerized meeting scheduling solutions allow users to create and schedule meetings, oftentimes providing an interface that allows the user to select a meeting time and location and invite other users to attend. However, such conventional solutions lack information regarding the real-world context in which scheduled meetings take place. For instance, a user may invite seven other people to attend a meeting in a small room that only comfortably fits four. Similarly, a user may schedule a meeting for mid-afternoon in a room that tends to be intolerably hot during the afternoon hours. Because conventional computerized scheduling systems lack real-world context, users may not be aware that they are attempting to schedule non-optimal meetings, which may result in meetings that are unproductive at best. At worst, such meetings can negatively impact the health of meeting participants who attend, for instance when the temperature, air composition, brightness, noise level, etc., of the meeting space are non-ideal. Conventional meeting solutions similarly do not offer information regarding the efficacy of meetings they are used to schedule and maintain. For instance, many organizations are plagued by overly long, poorly attended, and recurring meetings that could be modified and/or avoided if more information regarding meeting quality was available.

Accordingly, the present disclosure is directed to a meeting insight computing system that reports useful and meaningful information regarding meeting quality. The meeting insight computing system relies on quality parameters received from a plurality of meeting quality monitoring devices. These parameters enable an understanding of the real-world context in which meetings take place and can be used by users or organizations to improve overall meeting quality. For example, based on the plurality of quality parameters, a "quality score" can be calculated for a meeting, with higher quality scores corresponding to better overall meetings. The specific factors that contribute to a quality score may vary from implementation to implementation, and may include how efficient the meeting was, an emotional sentiment expressed by meeting participants, how comfortable the meeting environment was, etc. Information regarding meeting quality may be distributed to members of an organization as meeting trends, for example listing the highest quality meetings, most productive times of day, most popular meeting spaces, etc. Furthermore, when new meetings are scheduled, the meeting insight computing system can generate an insight aimed at improving a quality score of the meeting by changing properties of the meeting (e.g., time, location, invited participants).

In this manner, the meeting insight computing system represents an improvement over conventional computerized meeting solutions, and therefore the field of computer technology itself. A fundamental purpose of such conventional solutions is the collection, processing, and reporting of meeting-related information to facilitate meetings between meeting participants. Because the meeting insight computing system retrieves, processes, and outputs new and specific meeting-related information, it has substantially greater utility than conventional systems and results in higher quality meetings. For example, meeting insights and trends reported by the claimed meeting insight computing system provide new and useful meeting-related information that would not be available from a conventional computerized meeting scheduler.

FIG. 1 shows an example meeting 100 that has been organized via a meeting insight computing system, as will be described in more detail below. For example, a user may use a scheduling interface presented by a meeting insight computing system to schedule a meeting at a given time and location, and to include specific meeting participants. Once scheduled, meeting invitations may be sent to the specified meeting participants, and the meeting location may be reserved for the specified meeting time. In other examples, however, meetings may be organized or scheduled in other suitable ways, and need not be scheduled at all (e.g., the meetings may be ad hoc).

As shown in FIG. 1, meeting 100 is taking place in a meeting location 102, which may be a dedicated meeting space, such as a conference room or board room, or any other suitable environment in which meetings can be held. Meeting 100 includes three meeting participants 104A, 104B, and 104C. It will be understood that meeting 100 may include any number of additional meeting participants attending remotely, for example via a conference call or a voice over IP service.

Finally, meeting 100 includes multiple meeting quality monitoring devices 106A-106D. As used herein, a "meeting quality monitoring device" is any device or service that has information regarding conditions within the meeting environment, the behavior of meeting participants, and/or any other information pertaining to the efficiency, comfort level, and/or general "quality" of a meeting space and/or meeting itself. Such information may take the form of a "meeting quality parameter," meaning quality parameters are measured by or retrieved from meeting quality monitoring devices. As will be discussed in more detail below, any meeting-related information may be described as a meeting quality parameter.

A wide variety of devices and services may be described as meeting quality monitoring devices. For example, in meeting 100, quality monitoring device 106A is a thermostat recording the current temperature in the meeting room. Air temperature has a bearing on human comfort level and can negatively affect how comfortable and productive the meeting is when too high or too low. Quality monitoring device 106A may additionally or alternatively measure air composition—relative levels of oxygen, carbon dioxide, carbon monoxide, humidity, ozone, etc.,—which can also have a negative effect on meeting participant health and comfort.

Quality monitoring device 106B is a camera (e.g., visible light camera, infrared camera) that may, for instance, record which of the invited meeting participants attended the meeting, the body language and/or facial expressions of meeting participants, the amount of time each participant spends contributing during the meeting, etc.

Quality monitoring device 106C is a microphone that may, for instance, detect speech patterns consistent with boredom, fatigue, etc., record how much time each participant spends speaking, record the ambient noise in the meeting location, etc.

Quality monitoring device 106D is a personal electronic device that may serve as a source of information regarding a specific meeting participant's behaviors. For example, device 106D may track information regarding how much a participant contributes to a meeting vs performing other tasks (e.g., texting, checking email, browsing the Internet), include information regarding a participant's schedule (e.g., how many other meetings they have attended that day), etc. Quality monitoring device 106D may, for example, take the form of a smartphone, desktop, tablet, laptop, and/or any other suitable electronic device. In some cases, data from quality monitoring device 106D may be supplemented with data stored in a remote location, for example a cloud server or database. Furthermore, quality monitoring device 106D may serve as a proxy indicator of a specific user's presence. For example, the current location of quality monitoring device 106D may be tracked via WiFi connections, Bluetooth (or other wireless signal) beacons present in the meeting space, etc. Presence of quality monitoring device 106D in a specific area (e.g., meeting room) may be used to infer that the owner of the device is also present in the specific area.

It will be understood that meeting 100 is shown as an example. Other meetings may take place in any suitable meeting location and have any suitable number of meeting participants. Furthermore, the meeting quality monitoring devices 106A-106D described above are non-limiting examples. Additional examples of meeting quality monitoring devices will be described below.

FIG. 2 illustrates an example method 200 for computer-generating meeting insights. Method 200 will generally be implemented on a meeting insight computing system, which may have any suitable form factor and hardware configuration. For example, a meeting insight computing system may take the form of a desktop, laptop, server, smartphone, tablet, wearable device, media center, etc. In some examples, a meeting insight computing system may take the form of computing system 600 described below with respect to FIG. 6.

At 202, method 200 includes collecting a plurality of quality parameters from a plurality of meeting quality monitoring devices. The plurality of quality parameters each quantify conditions during one or more previously-conducted meetings and are useable to determine an overall quality score for each of the previous meetings. This is schematically illustrated with respect to FIG. 3, which depicts an example meeting insight computing system 300 useable to schedule and manage meetings such as meeting 100. As indicated above, meeting insight computing system 300 may be implemented with any suitable computer hardware, and its functions may in some cases be distributed across any number of discrete devices.

Meeting insight computing system 300 includes a meeting evaluation machine (e.g., one or more processors and associated components) 302 configured to collect and process quality parameters from meeting quality monitoring devices. A graphical scheduling interface 304 is useable to schedule meetings at specific times and locations and including specific meeting participants. Meeting insight computing system 300 also includes an insight generation machine 306 configured to generate meeting insights. As discussed above, each of these components may be implemented on any suitable hardware and distributed across any suitable number of discrete devices. In some examples, functions performed by the meeting evaluation machine, scheduling interface, and/or insight generation machine may be performed by computing system 600 of FIG. 6.

Meeting evaluation machine 302 is configured to maintain and evaluate quality parameters 308. A "quality parameter" is any piece of information that reflects, or can be correlated with, the efficiency, productivity, comfort level, etc., of a previously-elapsed or currently-ongoing meeting. Accordingly, non-limiting examples of quality parameters include: air temperature, air composition, brightness, ambient noise level, room occupancy (e.g., expressed as a binary value or an actual number of participants), a quantified average attention level, a quantified average level of fatigue, a percentage of participants who contributed during the meeting, a meeting attendance metric (e.g., a number of absences or late arrivals during the meeting), meeting materials distributed to participants in advance of the meeting (e.g., a quality of the materials, how far in advance the materials were distributed, a relevance of the materials), whether the meeting started or ended on time, an emotional sentiment expressed by meeting participants (e.g., based on body language, tone of voice, explicit statements), average number of other meetings attended by meeting participants that day/week/other period, results of a post-meeting survey (e.g., whether participants felt the meeting was necessary or productive), participant roles or duties, participant workplace locations (e.g., how far did each participant travel to reach the meeting), whether the meeting is recurring, how many participants attended remotely, etc.

Quality parameters 308 may be stored for any suitable number of meetings. In some cases, the meeting insight computing system may maintain a historical archive of quality parameters associated with all meetings the computing system was used to schedule or manage, or the meeting insight computing system may only store quality parameters for meetings that meet user-specified criteria. In some examples, quality parameters may be collected for meetings that the meeting insight computing system was not used to manage or schedule—e.g., meetings that were scheduled using a different medium, or impromptu meetings that were not scheduled at all. For instance, the meeting insight computing system may begin tracking meeting quality parameters any time it detects that a space typically used for meetings is occupied by one or more people during business hours.

Meeting quality parameters may be sorted or organized in any suitable way. In some examples, the meeting insight computing system may maintain a list of historical meetings, the participants, time, and location for each of the historical meetings, and a set of quality parameters for each of the historical meetings. Thus, the meeting quality parameters maintained by the meeting evaluation machine may be searchable or filterable, such that it is possible to view quality parameters associated with all meetings that took place at a particular location (e.g., room, building, campus, region), a particular time (e.g., time-of-day, day-of-week, season, year), meetings that had a specific number of participants, meeting that specific participants attended, etc.

The meeting evaluation machine retrieves quality parameters 308 from a plurality of meeting quality monitoring devices 310 (e.g., quality monitoring devices 106A-106D of FIG. 1). In some cases, meeting quality monitoring devices 310 may be accessed over a network 312, such as the Internet. Nonlimiting examples of meeting quality monitoring devices include: temperature sensors, air composition sensors, motion sensors, brightness sensors, cameras (e.g., visible light or infrared), microphones, pressure sensors (e.g., embedded in a floor, table, or chairs), network communication interfaces (e.g., used to detect device presence via WiFi or Bluetooth), personal devices (e.g., usage history, current location), local or remote databases/services (e.g., communications activity, employee records), etc.

Returning briefly to FIG. 2, at 204, method 200 includes receiving an input to schedule an upcoming meeting at a user-designated meeting time, in a meeting location, and with one or more meeting participants. In some examples, the input may include additional or alternative information when scheduling the meeting, for instance including a meeting topic, meeting agenda, history of past meetings, special meeting requirements (e.g., required AV equipment, wheelchair accessibility, time zone restrictions), etc. Such an input may be provided to a graphical scheduling interface of a meeting insight computing system, at which point it may be correlated with similar meetings that took place in the past. Furthermore, more granular or detailed information may be derived based on the user input to improve the ability of the system to predict the quality of the upcoming meeting. For example, based on the specified meeting location, the meeting insight computing system may determine how large the meeting location is, whether it has windows or other sources of light, how close it is to the invited meeting participants, typical temperature/air composition of the meeting space, whether AV equipment is present, etc.

Figure 3:
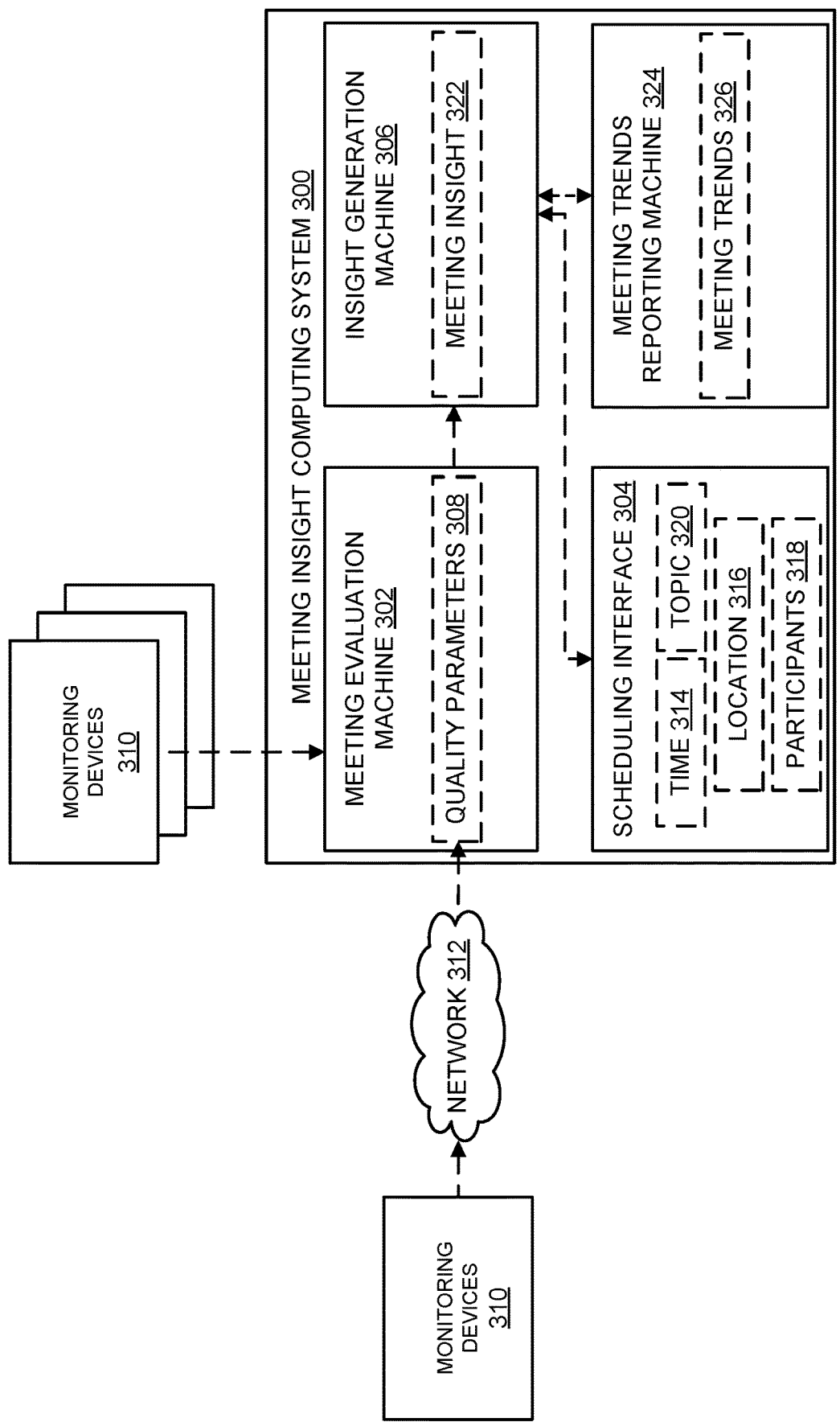
FIG. 3 schematically depicts an example meeting insight computing system.

FIG. 3 schematically shows an example graphical scheduling interface 304 of the meeting insight computing system 300, which generates a user interface useable by users of the meeting insight computing system to create and manage meetings. The specific layout of the user interface may vary from implementation to implementation. An example user interface will be described below with respect to FIG. 4.

In general, meetings scheduled via the scheduling interface will occur at a specified time 314 and location 316 and include specific meeting participants 318. In some cases, a meeting topic 320 may be specified. The scheduling interface may be configured to track all meetings that the meeting insight computing device is used to schedule and maintain. Thus, if a user attempts to schedule a meeting that conflicts with another meeting (e.g., because the meeting is at the same time and location as another meeting, or an invited participant has already committed to attend a different meeting at the same time), then the scheduling interface may notify the user of the conflict. Furthermore, once a meeting has been created, the scheduling interface may automatically send invitations to the invited participants and reserve the meeting location at the designated meeting time.

Returning again to FIG. 2, at 206, method 200 includes reporting a meeting insight generated based on the meeting time, the meeting location, the one or more meeting participants, and the plurality of quality parameters. Additional or alternative information may in some examples serve as the basis for the meeting insight, such as, for example, a topic of the meeting. The meeting insight includes a recommendation to change one or more of the meeting time, meeting location, and meeting participants to improve a quality score of the upcoming meeting. The meeting insight may be reported in any suitable way, including via the graphical scheduling interface at the time the meeting is scheduled.

Returning to FIG. 3, insight generation machine 306 of meeting insight computing system 300 is configured to generate meeting insights 322 based on the meeting quality parameters maintained by the meeting evaluation machine. Such insights can include valuable information regarding overall meeting quality, whether recurring or ongoing meetings are useful/productive, whether upcoming meetings are likely to be worthwhile, etc.

In some examples, meeting insights may be generated each time a user schedules a new meeting via the scheduling interface. In such examples, each meeting insight includes a meeting recommendation that is predicted to improve a quality score of the newly-created meeting. As indicated above, a quality score may take any suitable form and may be calculated in any suitable way. In one example, the quality score of a meeting may be based on a meeting productivity metric, a participant emotional sentiment metric, and an environmental comfort metric. These metrics may in turn be calculated in any suitable way, and in some cases may be derived from the plurality of quality parameters. In other words, each of the quality parameters maintained by the meeting evaluation machine may have an impact on an overall "quality score" of the quality parameter's associated meeting. A meeting in which the air temperature is at a comfortable value (e.g., between 68 and 72 degrees Fahrenheit) may have a relatively higher quality score than meetings in which the air temperature is excessively high or low. Other quality parameters (e.g., air quality, meeting attendance, estimated fatigue level) may have similar effects on the overall meeting quality score.

In some examples, each meeting may start with a default maximum quality score, and any negative quality parameters (e.g., room is too hot or too noisy) may deduct from the default maximum quality score. In other examples, each quality parameter may have an associated numerical subscore, with the various subscores being added together to give the overall quality score. The various quality parameters may be normalized or weighted in any suitable way. In some examples, this weighting may be dynamically changed over time—e.g., based on user feedback and/or the perceived importance of a given parameter to overall meeting quality. This can be used to address the fact that some quality parameters may be linked—for example, an "average attentiveness" quality parameter may be linked with air temperature and quality, in that it is harder to pay attention to the meeting when the meeting environment is uncomfortable.

Additionally, or alternatively, a single meeting may have numerous quality scores, each focused on a different facet of the meeting experience. For example, one quality score may reflect the perceived comfort of the meeting environment (e.g., based on air temperature, quality, noise level), while another quality score reflects the timeliness of the meeting (e.g., starting/ending on time, whether participants arrived on time), and yet another reflects the productivity level of the meeting (e.g., whether stated objectives were reached, whether participants stayed on topic, whether all participants contributed). This can be used to further discern the relationship between various quality parameters and overall meeting quality. For instance, if a meeting is observed to be unproductive, and yet took place in a relatively comfortable environment, then it may be inferred that the time-of-day or specific mix of meeting participants had a larger effect on overall meeting quality.

When quality parameters and overall quality scores for historical meetings are known, the insight generation machine may identify trends useable to predict the overall quality of future meetings. For example, a user may attempt to schedule a new meeting including multiple participants in a relatively small room during the hottest time of day. Based on analysis of historical meetings, the insight generation machine may conclude that the meeting is likely to be uncomfortably cramped, suffer from high temperature and poor air quality, and therefore result in a low-quality meeting. As a result, the insight generation machine may recommend to the user that they change some aspect of the meeting to improve the predicted quality score. For example, the user may be prompted to reduce the number of participants, change the meeting time, change the meeting location, etc.

In general, an insight may be generated to address any quality parameter that is predicted to be non-optimal for a future meeting. For example, meeting insights may include recommendations based on air temperature, air quality, noise level, brightness level, location size, time-of-day, day-of-week, season, number of invited participants, identities/roles of specific participants, proximity to other meetings, commute times for invited participants, workload/availability of invited participants, etc.

As a specific example, the meeting insight may indicate that the meeting location is too large or small given a quantity of the one or more meeting participants, and provide a recommendation to move the upcoming meeting to a different location (i.e., one of more appropriate size). Similarly, the meeting insight may indicate that the meeting location is in close proximity to a disruptive source of noise (e.g., construction), and may provide a recommendation to move the upcoming meeting to a quieter meeting location. Another example meeting insight may indicate that meetings taking place at the scheduled meeting time of the upcoming meeting have relatively low quality scores and recommend changing the meeting time. Furthermore, the meeting insight may indicate that previously-elapsed meetings having a similar meeting topic to the upcoming meeting tended to include one or more specific meeting participants. The meeting insight may therefore include a recommendation to invite the specific meeting participants to the upcoming meeting.

In many cases, the recommendation included in the meeting insight may simply be a recommendation, meaning the user can decide whether the recommendation should be implemented, then manually do so. Additionally, or alternatively, the meeting insight computing system may be configured to automatically implement the recommendation to improve meeting quality. For example, the meeting insight computing system may be configured to automatically take actions aimed at improving meeting quality with or without prompting the user and with or without regard to user input. Such automatic actions may include, for instance, adjusting operation of a building's HVAC system or lighting system during the meeting, or automatically notifying specific individuals that a meeting is about to occur that may benefit from their presence.

Though meeting insights are generally described herein as applying to meetings having multiple participants, the meeting insight computing system may in some cases generate insights for only a single user. For instance, an individual may work in various different environments or workspaces over a period of time (e.g., day, week), and receive meeting insights indicating which workspace was most productive, which of their personal devices caused distractions, etc.

Figure 4:
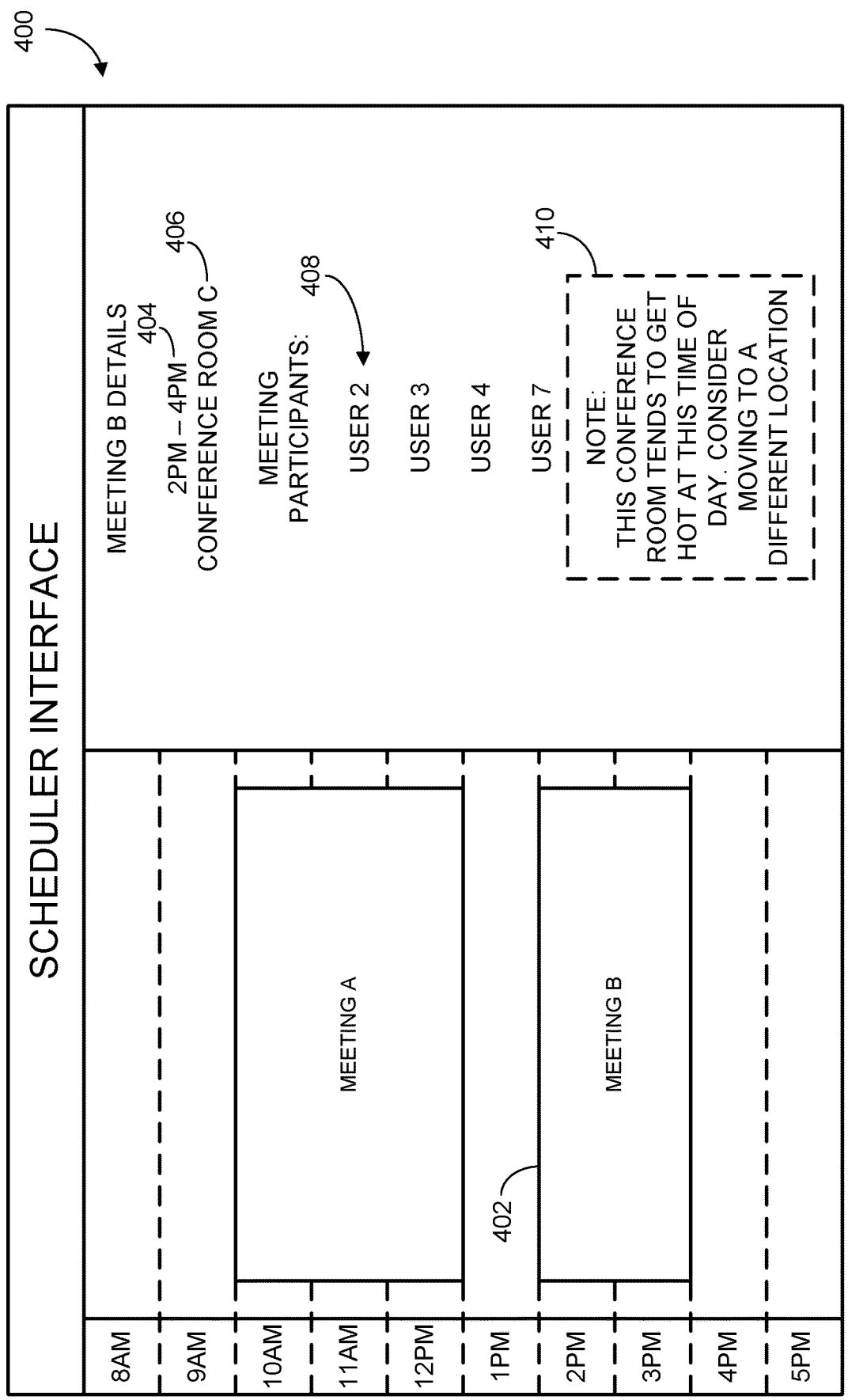
FIG. 4 depicts an example graphical scheduling interface of a meeting insight computing system.

FIG. 4 illustrates an example user interface 400 generated by the scheduling interface of the meeting insight computing system. As shown, the scheduling interface has been used to schedule a meeting 402. Meeting 402 takes place at a specific time 404 (i.e., 2 PM to 4 PM), at a specific location 406 (i.e., conference room C), and includes specific participants 408 (i.e., users 2, 3, 4, and 7). Furthermore, user interface 400 is shown displaying a meeting insight 410 generated by the meeting insight generation machine. Meeting insight 410 indicates that the conference room tends to be hot at the scheduled meeting time and recommends that the user consider changing the meeting location.

It will be understood that the specific interface 400 shown in FIG. 4, as well as the meeting insight 410, are non-limiting examples. Alternative user interfaces may include any suitable information and meeting insights and may use any suitable layout.

Returning briefly to FIG. 3, meeting insight computing system 300 also includes a meeting trends reporting machine configured to, based on the plurality of quality parameters, report meeting trends to individuals in an organization. For example, one or more of the meeting trends may specify times-of-day and meeting locations correlated with meetings having high quality scores. In other words, the meeting trends reporting machine may constitute a workplace analytics service useable by managers, human resources workers, individual users, etc., to gain information about which conference rooms are most productive, the optimal times to hold meetings, the optimal number and composition of meeting participants, etc.

In some examples, meeting trends may be distributed on a recurring basis—e.g., daily, weekly, monthly—and include trends such as the most popular conference rooms, how much time individual users spent in meetings, which meetings were most productive, etc. In an example scenario, the meeting trends reporting machine may determine that a weekly-recurring meeting ties up a popular conference room, and yet is consistently poorly-attended and not productive. Accordingly, the meeting trends reporting machine may provide meeting trends to a meeting owner, HR worker, manager, etc., suggesting that the recurring meeting consistently has a low quality score and perhaps should be modified or cancelled. Similarly, meeting trends may call out particularly influential meeting participants. This may be done based on an individual's job/role, their area of expertise, their performance in prior meetings, the type of meeting being scheduled (e.g., a specific individual is observed to do well in brainstorming sessions), etc. For example, one or more of the reported meeting trends may identify specific meeting participants that consistently contribute to meetings having high quality scores. The meeting trends reporting machine may similarly identify meetings that are consistently deemed to be uncomfortable or unhealthy (e.g., too loud, too hot, poor air quality). Such a listing may in some cases include a recommendation, for example to open a service ticket to service equipment or alter operation of a building heating, ventilation, and air conditioning (HVAC) system.

In some examples, meeting trends may take the form of a chart or graph—for example, a heatmap may be used to show average temperature and air quality for various meeting locations, with average or scheduled meeting occupancy overlaid on each location. This can be used to pick an ideal meeting location for a particular meeting, modify or cancel scheduled meetings, etc.

In some examples, meeting trends may be used to make decisions regarding building or space planning. For example, a meeting trend may indicate that a particular group of individuals are consistently in the same meetings and recommend that these individuals be assigned offices or workplaces near each other. The trend may further suggest that these workers be positioned near an appropriately-sized conference room or other meeting space. Similarly, the trend may reflect that certain workers or meetings tend to generate more noise than others and recommend placing those workers/meetings in areas where such noise is unlikely to be disruptive (e.g., on a separate floor or in a separate building).

In some examples, meeting quality scores and/or specific subscores may be gamified. For example, the meeting trends reporting machine may be configured to generate leaderboards indicating the most productive meetings, most valuable meeting participants, etc. Furthermore, performance incentives may be offered to improve quality scores—for example, participants in the most productive meetings over a period of time may be awarded a prize.

FIG. 5 depicts an example interface 500 including various meeting trends reported by a meeting trends reporting machine. Specifically, interface 500 includes a trend 502 including a list of the best meeting rooms. Such rooms may be identified, for example, by tracking the popularity of various meeting rooms, typical environmental conditions, typical emotional sentiment during meetings taking place in the meeting rooms, meeting productivity, etc. Another trend 504 lists the best times to hold meetings, which similarly may be based on popularity, environmental conditions, participant emotional sentiment, meeting productivity, etc. Meeting trend 506 includes a list of meetings having the overall highest quality, based on quality score.

It will be understood that a meeting trend may capture virtually any meeting-related information that can be derived from the plurality of quality parameters. Meeting trends may be distributed to any suitable group of people within an organization and may be generated or distributed with any suitable frequency. Furthermore, the contents of FIG. 5, including the specific layout of interface 500 and meeting trends 502, 504, and 506 are presented as nonlimiting examples.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
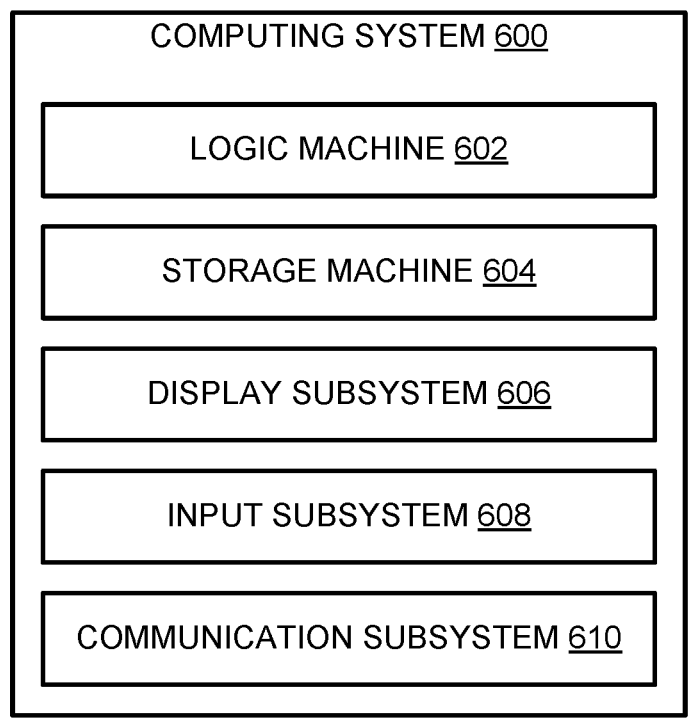
FIG. 6 schematically depicts an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc.

The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 610 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In an example, a meeting insight computing system comprises: a meeting evaluation machine configured to collect, from a plurality of meeting quality monitoring devices, a plurality of quality parameters each quantifying meeting conditions during one or more previously-elapsed meetings, the plurality of quality parameters being usable to determine an overall quality score for each of the one or more previously-elapsed meetings; a graphical scheduling interface configured to facilitate scheduling of an upcoming meeting at a designated meeting time, in a meeting location, and with one or more meeting participants; and an insight generation machine configured to, based on the meeting time, the meeting location, the one or more meeting participants, and the plurality of quality parameters, report a meeting insight via the graphical scheduling interface, the meeting insight including a recommendation to change one or more of the meeting time, meeting location, and meeting participants to improve a quality score of the upcoming meeting. In this example or any other example, each quality score is based on a meeting productivity metric, a participant emotional sentiment metric, and an environmental comfort metric. In this example or any other example, the meeting productivity metric, participant emotional sentiment metric, and environment comfort metric are each derived from the plurality of quality parameters. In this example or any other example, the recommendation included in the meeting insight is automatically implemented by the meeting insight computing system. In this example or any other example, the meeting insight indicates that the meeting location is too large or too small given a quantity of the one or more meeting participants, and the recommendation is to move the upcoming meeting to a different meeting location. In this example or any other example, the meeting insight indicates that meetings taking place at the meeting time of the upcoming meeting have relatively low quality scores, and the recommendation is to change the meeting time of the upcoming meeting. In this example or any other example, the meeting insight indicates that previously-elapsed meetings having a similar meeting topic to the upcoming meeting included one or more specified meeting participants, and the recommendation is to invite the one or more specified meeting participants to the upcoming meeting. In this example or any other example, the meeting insight indicates that the meeting location of the upcoming meeting is in close proximity to a disruptive source of noise, and the recommendation is to move the upcoming meeting to a quieter meeting location. In this example or any other example, the system further comprises a meeting trends reporting machine configured to, based on the plurality of quality parameters, report meeting trends to individuals in an organization, one or more of the meeting trends specifying times-of-day and meeting locations correlated with meetings having high quality scores. In this example or any other example, the individuals in the organization are human resources managers, and one or more of the meeting trends indicate that a recurring meeting consistently has a low quality score. In this example or any other example, one or more of the meeting trends identify specific meeting participants that consistently contribute to meetings having high quality scores. In this example or any other example, the plurality of quality parameters includes an indication of air composition in meeting locations associated with the one or more previously-elapsed meetings. In this example or any other example, the plurality of quality parameters includes a meeting attendance metric for each of the one or more previously-elapsed meetings.

In an example, a method for computer-generating meeting insights comprises: at a computing device, collecting a plurality of quality parameters from a plurality of meeting quality monitoring devices, the plurality of quality parameters each quantifying meeting conditions during one or more previously-elapsed meetings and being usable to determine an overall quality score for each of the one or more previously-elapsed meetings; at the computing device, receiving an input to schedule an upcoming meeting at a user-designated meeting time, in a meeting location, and with one or more meeting participants; and at the computing device, reporting a meeting insight generated based on the meeting time, the meeting location, the one or more meeting participants, and the plurality of quality parameters, the meeting insight including a recommendation to change one or more of the meeting time, meeting location, and meeting participants to improve a quality score of the upcoming meeting. In this example or any other example, each quality score is based on a meeting productivity metric, a participant emotional sentiment metric, and an environmental comfort metric. In this example or any other example, the recommendation included in the meeting insight is automatically implemented by the meeting insight computing system. In this example or any other example, the meeting insight indicates that the meeting location is too large or too small given a quantity of the one or more meeting participants, and the recommendation is to move the upcoming meeting to a different meeting location. In this example or any other example, the meeting insight indicates that meetings taking place at the meeting time of the upcoming meeting have relatively low quality scores, and the recommendation is to change the meeting time of the upcoming meeting. In this example or any other example, the meeting insight indicates that the meeting location of the upcoming meeting is in close proximity to a disruptive source of noise, and the recommendation is to move the upcoming meeting to a quieter meeting location.

In an example, a meeting insight computing system comprises: a meeting evaluation machine configured to collect, from a plurality of meeting quality monitoring devices, a plurality of quality parameters each quantifying meeting conditions during one or more previously-elapsed meetings, the plurality of quality parameters being usable to derive a meeting productivity metric, a participant emotional sentiment metric, and an environmental comfort metric for each of the one or more previously-elapsed meetings and calculate a quality score for each of the one or more previously-elapsed meetings based on the meeting productivity, participant emotional sentiment, and environmental comfort metrics; a graphical scheduling interface configured to facilitate scheduling of an upcoming meeting having a meeting topic, at a meeting time, in a meeting location, and with one or more meeting participants; and an insight generation machine configured to, based on the meeting topic, the meeting time, the meeting location, the one or more meeting participants, and the plurality of quality parameters, generate a meeting insight including a recommendation to change one or more of the meeting time, meeting location, and meeting participants to improve a quality score of the upcoming meeting, and automatically implement the recommendation.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A meeting insight computing system, comprising:
a meeting evaluation machine configured to collect, from a plurality of meeting quality monitoring devices, a plurality of quality parameters each quantifying meeting conditions automatically sensed by at least one of the meeting quality monitoring devices during one or more previously-elapsed meetings, the plurality of quality parameters being usable to determine an overall quality score for each of the one or more previously-elapsed meetings;
a graphical scheduling interface configured to facilitate scheduling of an upcoming meeting at a designated meeting time, in a meeting location, and with one or more meeting participants; and
an insight generation machine configured to, based on the meeting time, the meeting location, the one or more meeting participants, and the plurality of quality parameters, automatically provide a recommendation for the upcoming meeting by:
predicting, based on the meeting time, the meeting location, the one or more meeting participants, and the plurality of quality parameters, a first quality score for the upcoming meeting;
identifying a potential change to one or more of the meeting time, the meeting location, and the one or more meeting participants predicted to improve the first quality score of the upcoming meeting to a second, improved quality score; and
reporting a meeting insight including the potential change as the recommendation via the graphical scheduling interface.

2. The meeting insight computing system of claim 1, where each quality score is based on a meeting productivity metric, a participant emotional sentiment metric, and an environmental comfort metric.

3. The meeting insight computing system of claim 2, where the meeting productivity metric, participant emotional sentiment metric, and environment comfort metric are each derived from the plurality of quality parameters.

4. The meeting insight computing system of claim 1, where the meeting insight indicates that the meeting location is too large or too small given a quantity of the one or more meeting participants, and the recommendation is to move the upcoming meeting to a different meeting location.

5. The meeting insight computing system of claim 1, where the meeting insight indicates that meetings taking place at the meeting time of the upcoming meeting have relatively low quality scores, and the recommendation is to change the meeting time of the upcoming meeting.

6. The meeting insight computing system of claim 1, where the meeting insight indicates that previously-elapsed meetings having a similar meeting topic to the upcoming meeting included one or more specified meeting participants, and the recommendation is to invite the one or more specified meeting participants to the upcoming meeting.

7. The meeting insight computing system of claim 1, where the meeting insight indicates that the meeting location of the upcoming meeting is in close proximity to a disruptive source of noise, and the recommendation is to move the upcoming meeting to a quieter meeting location.

8. The meeting insight computing system of claim 1, further comprising a meeting trends reporting machine configured to, based on the plurality of quality parameters, report meeting trends to individuals in an organization, one or more of the meeting trends specifying times-of-day and meeting locations correlated with meetings having high quality scores.

9. The meeting insight computing system of claim 8, where the individuals in the organization are human resources managers, and one or more of the meeting trends indicate that a recurring meeting consistently has a low quality score.

10. The meeting insight computing system of claim 8, where one or more of the meeting trends identify specific meeting participants that consistently contribute to meetings having high quality scores.

11. The meeting insight computing system of claim 1, where the plurality of quality parameters includes an indication of air composition in meeting locations associated with the one or more previously-elapsed meetings.

12. The meeting insight computing system of claim 1, where the plurality of quality parameters includes a meeting attendance metric for each of the one or more previously-elapsed meetings.

13. A method for computer-generating meeting insights, comprising:
- at a computing device, collecting a plurality of quality parameters from a plurality of meeting quality monitoring devices, the plurality of quality parameters each quantifying meeting conditions automatically sensed by at least one of the meeting quality monitoring devices during one or more previously-elapsed meetings and being usable to determine an overall quality score for each of the one or more previously-elapsed meetings;
- at the computing device, receiving an input to schedule an upcoming meeting at a user-designated meeting time, in a meeting location, and with one or more meeting participants; and
- at the computing device, automatically providing a recommendation for the upcoming meeting by:
  - at the computing device, predicting, based on the meeting time, the meeting location, the one or more meeting participants, and the plurality of quality parameters, a first quality score of the upcoming meeting;
  - at the computing device, identifying a potential change to one or more of the meeting time, the meeting location, and the one or more meeting participants predicted to improve the first quality score of the upcoming meeting to a second, improved quality score; and
  - at the computing device, reporting a meeting insight including the potential change as the recommendation.

14. The method of claim 13, where each quality score is based on a meeting productivity metric, a participant emotional sentiment metric, and an environmental comfort metric.

15. The method of claim 13, where the meeting insight indicates that the meeting location is too large or too small given a quantity of the one or more meeting participants, and the recommendation is to move the upcoming meeting to a different meeting location.

16. The method of claim 13, where the meeting insight indicates that meetings taking place at the meeting time of the upcoming meeting have relatively low quality scores, and the recommendation is to change the meeting time of the upcoming meeting.

17. The method of claim 13, where the meeting insight indicates that the meeting location of the upcoming meeting is in close proximity to a disruptive source of noise, and the recommendation is to move the upcoming meeting to a quieter meeting location.

18. A meeting insight computing system, comprising:
- a meeting evaluation machine configured to collect, from a plurality of meeting quality monitoring devices, a plurality of quality parameters each quantifying meeting conditions automatically sensed by at least one of the meeting quality monitoring devices during one or more previously-elapsed meetings, the plurality of quality parameters being usable to derive a meeting productivity metric, a participant emotional sentiment metric, and an environmental comfort metric for each of the one or more previously-elapsed meetings and calculate a quality score for each of the one or more previously-elapsed meetings based on the meeting productivity, participant emotional sentiment, and environmental comfort metrics;
- a graphical scheduling interface configured to facilitate scheduling of an upcoming meeting having a meeting topic, at a meeting time, in a meeting location, and with one or more meeting participants; and
- an insight generation machine configured to, based on the meeting topic, the meeting time, the meeting location, the one or more meeting participants, and the plurality of quality parameters, automatically provide a recommendation for the upcoming meeting by:
  - predicting, based on the meeting time, the meeting location, the one or more meeting participants, and the plurality of quality parameters, a first quality score for the upcoming meeting;
  - identifying a potential change to one or more of the meeting time, the meeting location, and the one or more meeting participants predicted to improve the first quality score of the upcoming meeting to a second, improved quality score; and
  - automatically implementing the potential change.

\* \* \* \* \*